Dec. 19, 1922.
T. H. THOMAS.
ELECTROPNEUMATIC BRAKE DEVICE.
FILED MAR. 17, 1921.
1,439,039.
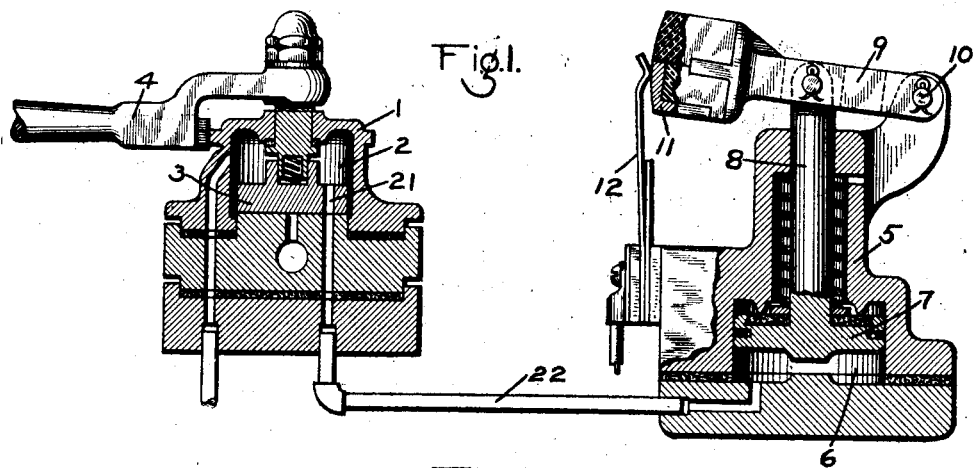
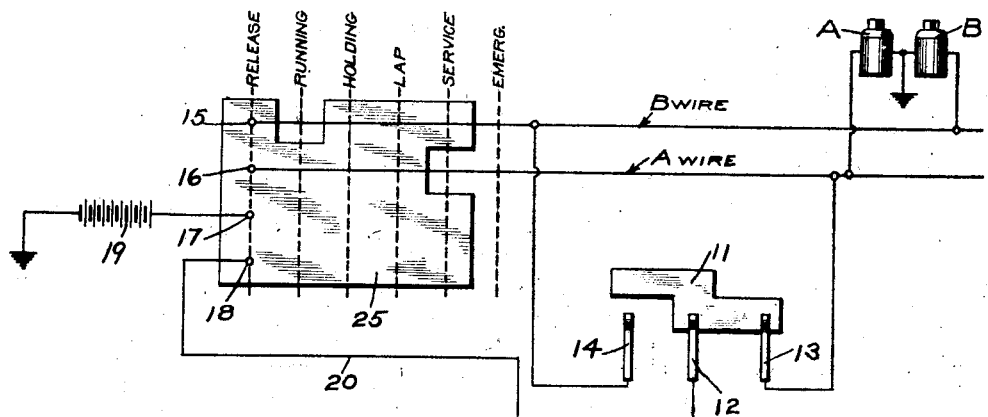
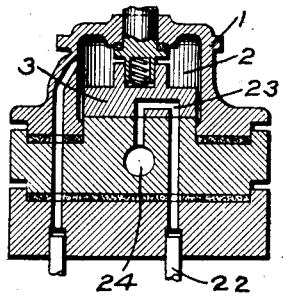
INVENTOR
THOMAS H. THOMAS
BY
*Wm. M. Cady*
ATTORNEY Patented Dec. 19, 1922.

1,439,039

UNITED STATES PATENT OFFICE.

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ELECTROPNEUMATIC-BRAKE DEVICE.

Application filed March 17, 1921. Serial No. 453,009.

*To all whom it may concern:*

Be it known that I, THOMAS H. THOMAS, a citizen of the United States, residing at Edgewood, in the county of Allegheny and State of Pennsylvania, have invented new and useful Improvements in Electropneumatic-Brake Devices, of which the following is a specification.

This invention relates to electro-pneumatic brakes, and more particularly to means for controlling the energization and deenergization of the brake magnets.

It has been found that the deenergization of a brake magnet occurs much more rapidly than the energization of the same magnet and thereby undesired operating results are sometimes obtained. For example; assume that two magnets A and B are employed for controlling the brakes. The magnet A may be energized and the magnet B deenergized in one position of the controlling brake switch such as running position, while the magnet A may be deenergized and the magnet B energized in another position, such as service application position. And further, the equipment may be so designed that the deenergization of both magnets A and B will cause an emergency application of the brakes.

If, under the above conditions, the brake switch is turned from running position to service application position, the magnet A will be quickly deenergized, but the magnet B energizes slowly, with the result that both magnets may be practically deenergized upon movement of the brake switch to service position, so that an emergency application of the brakes is produced when not intended.

The principal object of my invention is to provide means for overcoming the above difficulty.

In the accompanying drawing: Fig. 1 is a vertical sectional view of an apparatus embodying my invention; Fig. 2 a diagram showing the positions of the brake switch and the circuit connections to the brake magnets; and Fig. 3 a sectional view of the brake valve device in service application position.

In Fig. 1 of the drawing is shown a brake valve device comprising a casing 1 having a valve chamber 2, containing a rotary valve 3 adapted to be operated by a handle 4.

According to my invention, a switch device is provided, comprising a casing 5 having a piston chamber 6, containing a piston 7. The stem 8 of the piston 7 is pivotally connected to a switch arm 9, fulcrumed on the pivot pin 10 and said switch arm carries at its movable end a contact bar 11 so shaped that in one position of the switch arm 9, contact fingers 12 and 13 are connected through the contact bar 11, while in another position, fingers 12 and 14 are connected together.

While not shown in the drawing, it will be understood that the brake switch is operated by the movement of the brake valve handle 4, and as shown in Fig. 2, the brake switch may be provided with stationary contacts 15, 16, 17, and 18, adapted to engage the movable drum contact 25.

The contact 15 is connected to the B wire which connects the brake magnets B throughout the train, the contact 16 to the A wire, leading to the brake magnet A, the contact 17 to a source of current 19, and contact 18 to a supply wire 20, which is connected to the finger 12 of the switch device 5.

The contact finger 14 of the switch device 5 is connected to the B wire, while contact finger 13 is connected to the A wire.

In release, running, and holding positions of the brake valve device 1, a port 21 supplies fluid under pressure from the rotary valve chamber 2, through pipe 22 to the piston chamber 6, while in service position, as shown in Fig. 3, the pipe 22 is connected, through a cavity 23 in the rotary valve 3 with an exhaust port 24.

When the brake valve and brake switch are in running position, the B wire is deenergized, while the A wire is energized, so that the brake magnet B is deenergized and the brake magent A is energized.

In this position of the brake valve device 1, fluid under pressure is supplied to the piston cylinders 6, so that piston 7 holds the switch arm 9 in the position shown in Fig. 1, in which the contact fingers 12 and 13 are connected.

If the brake valve and brake switch are turned to service application position, connection is made through the brake switch drum for energizing the B wire and for deenergizing the A wire, but it will now be noted that the A wire will still be energized from the source of current 19, through the wire 20 and the contact fingers 12 and 13 of the switch device 5, so long as the switch arm 9 holds the contact bar 11 in its upper position.

In the service application position of the brake valve device, as shown in Fig. 3, the pipe 22 is vented to the exhaust port 24, but it requires a predetermined time interval to reduce the pressure in piston chamber 6, so as to permit the piston 7 to move down and this interval is made such that the magnet B will be fully energized before the switch arm 9 will be moved to open the supply circuit connection through the contact bar 11 to the A wire.

The volume of the pipe 22 and piston chamber 6 may be sufficient for this purpose, but if necessary a small volume reservoir may be connected to the pipe 22 or the vent port area in the service position may be restricted to delay the release of fluid from the piston cylinder 6.

By the above means, the deenergization of one brake magnet by the movement of the brake switch is delayed to permit the full energization of another brake magnet, and thus the possibility of both magnets being deenergized at the same time is prevented, when not intended.

In a similar manner, if the brake valve and brake switch are turned from service position to running position, the B wire will be held energized through the contact bar 11, although the circuit is opened at the brake switch, until the fluid pressure supplied through the brake valve device to the piston chamber 6 is sufficient to raise the piston 7.

Having now described my invention, what I claim as new and desire to secure by Letters Patent, is:—

1. In an electro-pneumatic brake, the combination with a brake magnet for controlling the brakes, of a brake switch having positions for opening and closing the circuit of said magnet and an auxiliary switch device for also controlling the opening and closing of the magnet circuit.

2. In an electro-pneumatic brake, the combination with brake magnets for controlling the brakes, of a brake switch having positions for energizing and deenergizing said magnets and an auxiliary switch device for maintaining a brake magnet energized upon movement of the brake switch to a position for deenergizing said magnet.

3. In an electro-pneumatic brake, the combination with brake magnets for controlling the brakes, of a brake switch having positions for energizing and deenergizing said magnets and an auxiliary switch device for holding a brake magnet energized upon movement of the brake switch to a position for deenergizing said magnet, the auxiliary switch device operating to deenergize said magnet after a predetermined time interval.

4. In an electro-pneumatic brake, the combination with brake magnets for controlling the brakes, of a brake switch having positions for energizing and deenergizing said magnets, a fluid pressure operated switch device for holding a brake magnet energized in a position of the brake switch for deenergizing said magnet, and means operated upon movement of the brake switch to said position for venting fluid under pressure from said switch device.

5. In an electro-pneumatic brake, the combination with a pair of brake magnets, of a brake switch having a position for opening the circuit of one magnet and closing the circuit of the other magnet and a switch device for closing an auxiliary circuit through the first magnet and operating to open said circuit after a time interval.

6. In an electro-pneumatic brake, the combination with a pair of brake magnets A and B, of a brake switch having one position for energizing the A magnet and deenergizing the B magnet and another position for deenergizing the A magnet and energizing the B magnet, an auxiliary fluid pressure operative switch device having one position for energizing the A magnet and deenergizing the B magnet and another position for deenergizing the A magnet and energizing the B magnet, and a brake valve device having one position for supplying fluid under pressure to said auxiliary switch device and another position for venting fluid from said switch device.

In testimony whereof I have hereunto set my hand.

THOMAS H. THOMAS.